April 6, 1926.
H. SILBERMANN
COLLECTOR FOR ELECTRIC CARS
Filed August 26, 1921
1,579,336
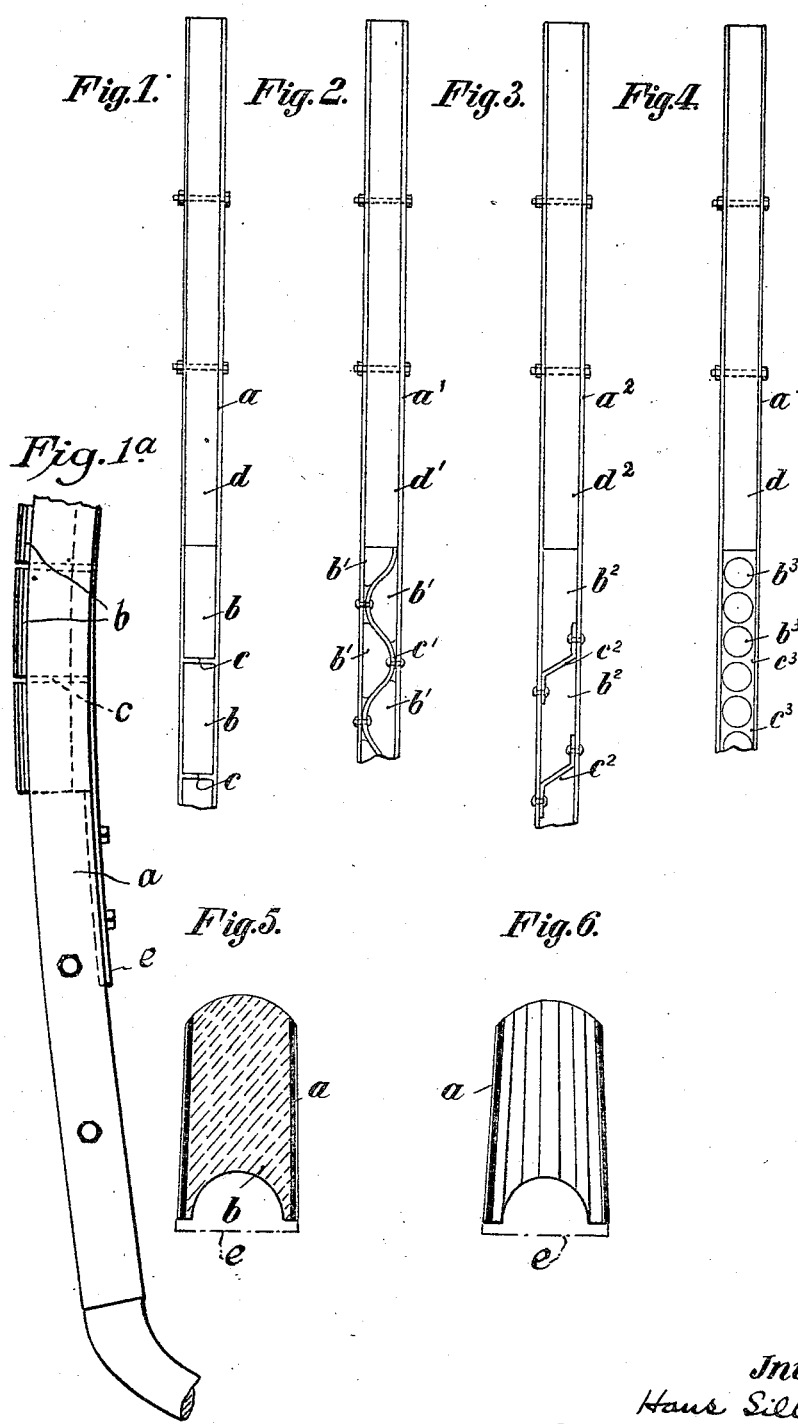

Patented Apr. 6, 1926.

1,579,336

UNITED STATES PATENT OFFICE.

HANS SILBERMANN, OF METGETHEN, NEAR KONIGSBERG, GERMANY, ASSIGNOR TO C. CONRADTY, OF NUREMBERG, GERMANY.

COLLECTOR FOR ELECTRIC CARS.

Application filed August 26, 1921. Serial No. 495,525.

(GRANTED UNDER THE PROVISIONS OF THE ACT OF MARCH 3, 1921, 41 STAT. L., 1313.)

*To all whom it may concern:*

Be it known that I, HANS SILBERMANN, a citizen of the German Republic, residing at Metgethen, near Konigsberg, Germany, have invented certain new and useful Improvements in Collectors for Electric Cars (for which I have filed applications in Germany, September 1, 1915, Patent No. 315,176; Japan, September 8, 1920; Belgium, July 9, 1920; Poland, July 6, 1920; Czechoslovakia, July 2, 1920; France, July 10, 1920), of which the following is a specification.

My invention relates to improvements in collectors for electric cars, and more particularly in collectors of the Siemens bow type. It has heretofore been proposed to provide collectors of this type with a shoe made from carbon. One of the objects of the improvements is to provide a collector of this class in which the carbon is not subject to injury from outer causes such as blows or bending of the collector. Another object of the improvements is to provide a collector which can be manufactured at comparatively low cost. With these and other objects in view my invention consists in providing the collector with a plurality of sectional carbon shoes of comparatively small size.

In working out a strong and practically efficient structure of this nature in which each carbon shoe or contact member is properly supported and protected, I have provided the metallic member of the bow which supports the contacts with a series of adjacent compartments or receptacles for the individual carbon contacts by which they are respectively filled out and which are thus effectively supported, protected against breakage and displacement and maintained in their several appointed relative positions, and in condition for use. Different modes of forming the said compartments or receptacles are shown in the drawings, no effort at exhaustive illustration being made, however. Divisional members or partitions serving the above purpose may have the function also of bracing the supporting structure, thereby adding very materially to its strength, as will be apparent on inspection of the drawings, wherein some of the figures show riveted sheet metal strip arrangements. The individual contacts may be separately molded beforehand out of gas carbon in the known way and made of a size to be retained in the bow by friction, but the clamping effect on the contacts of the side pieces may be supplemented by the provision of a supporting rod, strip, cross-wall, ledges or the like beneath the contacts or by the employment of other means for preventing the contacts from being forced out of the collector which will readily suggest themselves to any one skilled in the art. It is evident also that the contact members may be molded in situ in the finished bow in such fashion as to remain a part thereof, the precise mode of manufacture and the particular means of preventing forcing of the carbon contacts through the collector being details for which novelty is not claimed.

In order that the invention be more clearly understood several examples embodying the same have been shown in the accompanying drawing, in which Fig. 1 is a partial plan view of the upper or bow part of a collector embodying the invention, Fig. 1ª is a side elevation of the collector shown in Fig. 1, parts being broken away.

Figs. 2 to 4, are similar plan views showing modifications,

Fig. 5 is a vertical cross-section on an enlarged scale of the collector shown in Fig. 1, and Fig. 6 is a cross-section similar to that shown in Figs. 1, 1ª, and showing a modification.

In the example shown in Figs. 1 and 5, the upper bow shaped branch or cross member of my improved collector consists of a pair of metal strips $a$ ($a^1$, $a^2$, $a^3$ in Figs. 2, 3 and 4 respectively) connected at their ends by rods $d$ ($d^1$, $d^2$, $d^3$ in Figs. 2, 3 and 4 respectively) of any suitable material. At the part intermediate the inner ends of the rods $d$ the strips $a$ are formed with ribs $c$ preferably connected with each other in a suitable way and dividing the portion intermediate the ends of the rods $d$ into sections of a suitable length and providing compartments or receptacles, which are filled out by contact members or shoes $b$ of carbon. It will be evident that any known or suitable means for preventing the contacts from being thrust out of the collector may, if deemed necessary, be provided. That shown in Fig. 1ª and indicated in Figs. 5 and 6 will serve as illustration and example. This means consists of a strip $e$ over the upper side of which fit the shaped undersides of the carbon contacts and which is secured at each end to the bow structure. By making the sections or compartments short, the carbon shoes embedded therein being small can readily be manufactured and have sufficient strength to avoid injury by outer influences such as blows or bending of the collector otherwise likely to produce irregular fracture with resultant impairment and at least partial disintegration. It will be understood that the individually supported sectional carbon contact members are electrically connected and together form a sectional unitary shoe. Their primary function as a conductor is thus assured and their durability is enhanced by the fact that being small they are exposed only to lesser strains and that they are well protected against destructive forces. In the preferred form of the collector shown in Fig. 1 the carbon shoes are provided only at such parts as make contact with the conductor and more particularly at the medium part of the upper branch of the collector.

As shown in Fig. 5 the strips $a$ are made so as to taper upwards and inwards to prevent the carbon shoes from falling from the collector strips $a$.

In the example shown in Fig. 2 the length between the ends of the rods $d^1$ is divided into sections or compartments by means of a wave like metal strip $c^1$ secured to the strips $a^1$, and the carbon shoes $b^1$ are shaped accordingly. In Fig. 3 I have shown substantially Z-shaped sheet metal strips $c^2$ riveted or otherwise secured to the strips $a^2$, said strips providing partitions disposed at an angle to the strips $a^2$ and forming compartments constituting receptacles for the carbon contact members. Accordingly the sectional carbon shoes $b^2$ are formed with angular end faces. In the modification shown in Fig. 4 the carbon members $b^3$ have circular cross-section, the space left between the same and the strips $a^3$ being filled out by metallic parts $c^3$ connecting the strips $a^3$.

In Fig. 6 I have shown a modification in which the shoe is composed of a bundle of elongated metallic and carbon members. I wish it to be understood that a carbon shoe of this composition may be used in any of the constructions shown in Figs. 1 to 4.

While in describing the invention reference has been made to particular examples embodying the same, I wish it to be understood that my invention is not limited to the constructions shown in the figures, and that various changes may be made in the general arrangement of the apparatus and the construction of its parts without departing from my invention.

I claim:

1. In a collector of the bow type, the combination, with the metallic bow, of a series of mechanically separate carbon contact members having established lines of division between them and disposed in the direction of its length on the medium portion of the horizontal part of said bow with said members located one beside the other in electrical connection to form a contact shoe.

2. In a collector of the bow type, the combination, with the metallic bow comprising in its upper branch a pair of spaced metallic strips, of a multiplicity of small separately supported carbon contact members disposed between said strips.

3. In a collector of the bow type, the combination, with the metallic bow, of a series of carbon contact members disposed on said bow one beside the other and having metallic contact members embedded therein.

4. In a collector of the bow type, the combination with the metallic bow, of a longitudinal series of short carbon contact members disposed on the bow, and metal parts carried by the bow individually supporting said carbon members and maintaining them in their appointed relative positions against endwise and crosswise strain.

5. In a collector of the bow type, the combination with a metallic bow having a transversely braced cross member, a series of relatively small electrically connected but physically separate carbon contact members located on said cross member between the transversely bracing means and individually supported and maintained thereby in their several appointed positions against endwise and crosswise strain.

6. In a collector of the bow type, a metallic support provided with division or partition means dividing the support into a series of relatively small contact receiving compartments or receptacles, and a corresponding series of carbon contact members fitting said compartments or receptacles and individually supported and maintained thereby in their several appointed relative positions.

In testimony whereof I hereunto set my hand.

HANS SILBERMANN.